UNITED STATES PATENT OFFICE.

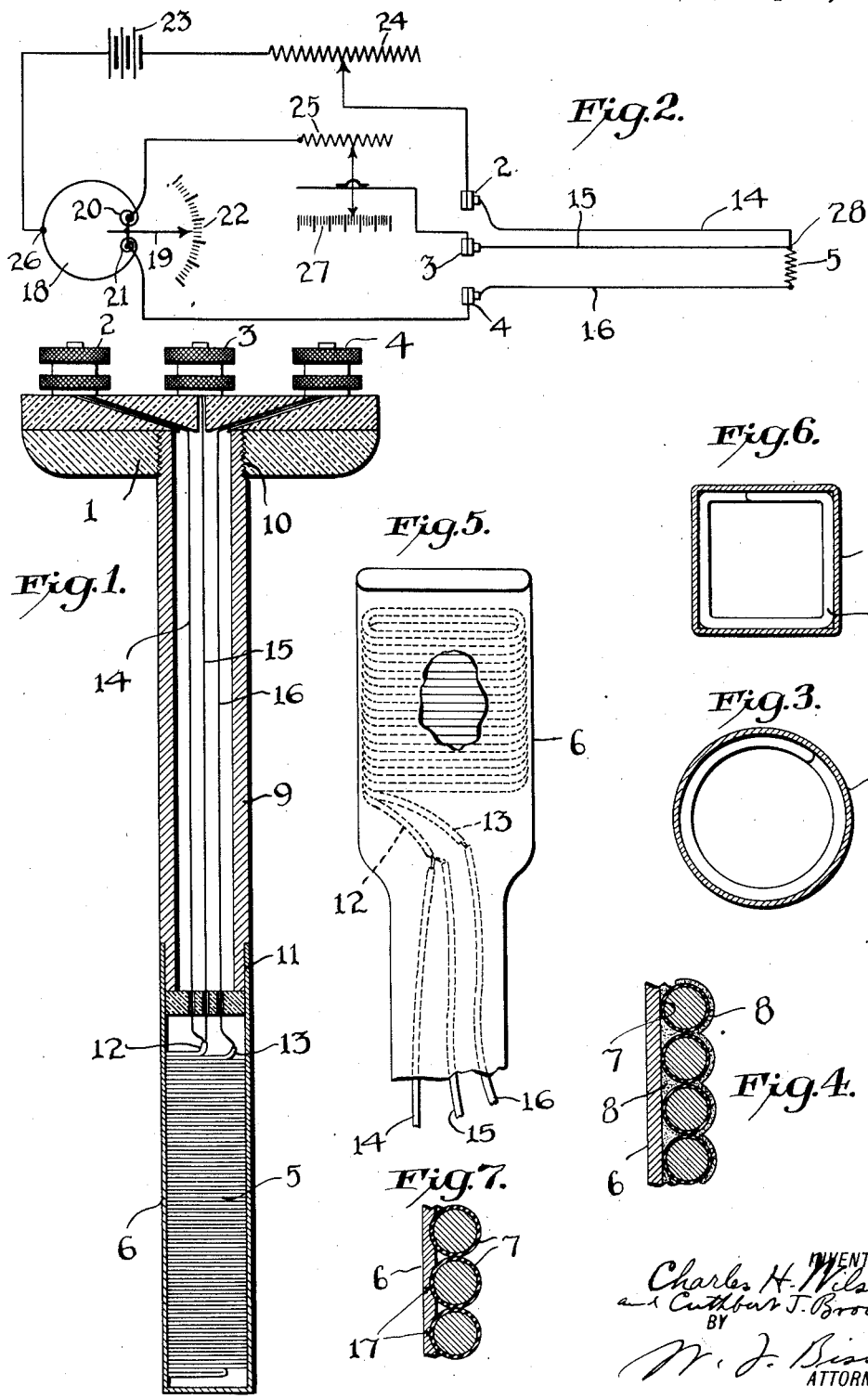

CHARLES H. WILSON, OF MOUNT VERNON, AND CUTHBERT J. BROWN, OF NORTH PELHAM, NEW YORK, ASSIGNORS TO WILSON-MAEULEN COMPANY, INCORPORATED, OF NEW YORK, N. Y., A CORPORATION OF NEW YORK.

ELECTRICAL-RESISTANCE THERMOMETER.

1,411,396.  Specification of Letters Patent.  Patented Apr. 4, 1922.

Application filed March 10, 1921. Serial No. 451,206.

*To all whom it may concern:*

Be it known that we, CHARLES H. WILSON and CUTHBERT J. BROWN, citizens of the United States, residing at Mount Vernon, New York, and North Pelham, New York, respectively, have invented new and useful Improvements in Electrical-Resistance Thermometers, of which the following is a specification.

This invention relates to measuring instruments and more particularly to the bulb of an electrical resistance thermometer wherein measurement of the changes in the electrical resistance of the unit, due to changes of temperature of that unit are measured as a means of measuring the temperature of the zone or medium in which the thermometer bulb is located.

One of the objects of the invention is to provide a resistance thermometer bulb, containing a resistance coil, in which the resistance to be measured follows as closely as possible and with as little time lag as possible, the temperature of the medium surrounding the bulb. It is to be noted that the so-called lag in temperature readings become actual errors when the thermometer is used to measure rapidly fluctuating temperatures.

One of the objects of the invention is to reduce this lag and thereby reduce the error in the reading of the instrument. The latter being a precision measuring apparatus, reduction of lag in the readings increases the precision of measurement.

The objectionable thermal lag in thermometer bulbs of the electrical resistance type has been due to the thermal blanketing of the pyrometer coil by the air gap between the winding and the sheath or by the poor thermal conductivity of the sheath. In accordance with the invention protecting sheaths of metal such as steel, nickel and brass may be used, which may be made thinner than sheaths of plastically applied clays, glasses or quartz, and yet have greater mechanical strength than those earthen materials.

In accordance with the invention the resistance coil is wound inside of the wall of the sheath, electrically insulated therefrom and supported thereby. Again, no inside core is used but the coil is hollow so as to provide an air core. In this way a strong mechanical construction is secured and a unit is provided in which the sheath rapidly conducts the heat to the resistance coil and in which an inside core to support the windings in position is obviated, thus increasing the sensitivity of the instrument.

With the above and other objects in view, the invention consists in the parts, improvements and combinations more fully pointed out hereinafter.

Referring now to the drawing in which several forms of the invention are illustrated, Fig. 1 illustrates a full-sized longitudinal section of the electrical resistance thermometer bulb forming part of the unit.

Fig. 2 is a diagram illustrating the use of the device shown in Fig. 1.

Fig. 3 is a cross section through the lower part of Fig. 1.

Fig. 4 is a longitudinal transverse section of a detail through the lower part of Fig. 1 showing the mode of supporting and cementing the resistance turns of wire to the inside of the sheath.

Fig. 5 is a detail view partly broken away illustrating another shape which the resistance bulb may assume.

Fig. 6 illustrates a third shape of the bulb.

Fig. 7 shows another mode of supporting the resistance wires in grooves within the sheath.

The resistance unit illustrated in Fig. 1 is carried by a frame 1 to which are secured a plurality of terminals or connections 2, 3, 4 which are in turn connected to the resistance coil. The resistance coil 5 is located within the sheath 6. The wall of the sheath is made of metal or heat conducting material, is preferably tubular, in form and may assume any of the shapes in cross section illustrated in the figures. The resistance coil 5 which is preferably arranged noninductively within the sheath 6 and is preferably wound in a single layer, is mounted on the inside of the wall of the sheath. The turns of wire are electrically insulated from the sheath and from each other, the wire which may be made of nickel, being thinly covered with silk insulation 7. Means are provided for supporting the wire upon the sheath as for example shellac cement 8 which cements the wires to the sheath. Cotton, silk, enamel or any standard insulation may be used on the wire of the thermometer coil, but such insulation needs to be only a few thousandths of an inch in thickness, as is common for the winding of coils for precision electrical instruments employing low voltages. The thermal lag of such electrical insulation is negligible, because it is so thin and such thin insulation may be used in accordance with the invention, because the insulating material is not required to mechanically support or mechanically protect the resistance winding.

In accordance with the invention, moreover, any permanent core or internal skeleton is done away with and the necessity for any supporting core or frame within the winding when the coil is completed and in service, is obviated.

In accordance with the invention the inside of the coil is hollow so as to form an air core. It will thus be observed that a metallic protection sheath is made use of, the air gap between the windings and the sheath is eliminated and still greater sensitivity results from the elimination of the core or frame inside of the thermometer coil.

The resistance bulb is connected to the frame 1 in various ways, and in some cases the frame may not be used at all. In the embodiment of the invention illustrated a neck 9 is used which may be screwed at 10 into the frame 1, the resistance bulb being carried by the other end of the neck as at 11. Various connections may be used for connecting the ends 12, 13 of the resistance coil to the terminals carried by the frame. In the form of the invention illustrated two compensating connecting wires 15 and 16 are used, these wires compensating or balancing the resistance of each other, and are connected one to each end of the resistance coil at 12 and 13. The third wire 14, from the current source, is connected and delivers current to the circuit at 28. The wires 14, 15 and 16 are respectively connected to the terminals 2, 3 and 4, and the two wires 15 and 16 are of substantially equal lengths and resistance. It will be understood that this type of three wire connection is one of several ways in which the instrument may be connected up.

Another mode of mounting the windings inside of the sheath is shown in Fig. 7 in which the insulation wound wires rest in grooves 17 turned, cut or pressed in the wall of the sheath. When the windings are of a sufficiently springy nature, it will be sufficient to rely upon their outward pressure against the walls of the sheath, instead of cementing them to the sheath.

With the above construction in mind, the operation of the instrument will be clear. One mode of connecting it in circuit is shown in Fig. 2. The resistance bulb is indicated at 5 and the terminals for resistance units are illustrated at 2, 3 and 4. The three connecting wires are shown at 14, 15 and 16. With this mode of measurement which makes use of the deflection method for securing the reading, a differential galvanometer 18 with needle 19 and two oppositely wound coils 20 and 21 are used, the needle playing over a scale 22. A battery 23 sends its current through a regulating rheostat 24, the current dividing into two branches, part of it returning from junction 28 through one branch by means of compensating lead wire 15 and known resistance 25 through one coil 20 of the differential galvanometer 18 to the junction point 26 and the other part of the current passing through the other branch through the thermometer resistance coil 5, compensating lead wire 16, terminal 4, differential coil 21 to the junction point 26. Before putting the instrument into use, both lines of the differential circuit from junction 26 to junction 28 are made equal in resistance by adjusting the amount of resistance in the calibrated and adjustable resistance 25. With both circuits equal in resistance, the current will be the same in each circuit and no deflection shown by the differentially wound galvanometer. Upon placing the thermometer bulb in a zone of higher temperature, which may be for example a temperature of 200 degrees Fahrenheit, the resistance of the coil in the thermometer bulb increases and less current flows through that circuit branch which also contains the galvanometer coil 21. There being more current flowing through coil 20 than through 21, the galvanometer deflects to a corresponding reading, which may be adjusted by regulating the rheostat 24, calibrating the galvanometer to read direct in terms of units of resistance or of temperature. If the resistance of 25 is increased until the current flowing through coil 20 equals that flowing through 21, the value of the resistance of 25 will then equal the resistance of bulb 5. So the resistance and corresponding temperature of bulb 5, may be determined by noting on the scale 27 the value of the calibrated resistance 25; when the galvanometer shows no deflection, the current through both differential branches being equal. Any other method for measuring resistance can be used; such as Wheatstone's bridge, or the potentiometric method, and the apparatus may be calibrated or graduated in units of resistance or corresponding temperature degrees.

It will be observed that because of the comparatively low temperatures measured, precision and accuracy of reading are essential as it is desired to quickly and correctly read the temperature to within a fraction of a degree. Owing to the construction which has been fully set forth above, the windings in the thermometer bulb follow the temperature of the surrounding medium and quickly and accurately determine the temperature reading of the zone whose temperatures are to be measured.

What we claim and desire to secure by Letters Patent is:

1. In an electrical resistance thermometer bulb, the combination of a metal-walled, heat conducting sheath and a resistance coil wound inside of the wall of said sheath, electrically insulated therefrom and supported thereby.

2. In an electrical resistance thermometer bulb, the combination of a metal-walled, heat conducting sheath and a resistance coil wound inside of the wall of said sheath, electrically insulated therefrom and supported thereby, the inside of the coil being hollow so as to form an air core.

3. In an electrical resistance thermometer bulb, the combination of a metal-walled, heat conducting, tubular sheath and a resistance coil wound in a single layer inside of the wall of said sheath, electrically insulated therefrom and supported thereby, the inside of the coil being hollow so as to form an air core.

4. In an electrical resistance thermometer bulb, the combination of a metal-walled, heat conducting sheath and a resistance coil wound inside of the wall of said sheath, electrically insulated therefrom and cemented thereto, the inside of the coil being hollow so as to form an air core.

5. An electrical resistance thermometer unit, comprising the combination of a frame, an electrical resistance thermometer bulb carried thereby, said bulb having a metal wall and a resistance coil wound inside the wall, electrically insulated therefrom and supported thereby, the coil being hollow so as to form an air core, terminals carried by the frame and connecting wires connecting said terminals to said coil.

6. An electrical resistance thermometer unit, comprising the combination of a frame, an electrical resistance thermometer bulb carried thereby, said bulb having a metal wall and a resistance coil wound inside of the wall, electrically insulated therefrom and supported thereby, the coil being hollow so as to form an air core, a plurality of terminals carried by the frame and a plurality of connecting wires connecting said plurality of terminals to the leads of said coil, the connecting wires being of substantially equal resistance.

7. An electrical resistance thermometer unit, comprising the combination of a frame, an electrical resistance thermometer bulb carried thereby, said bulb having a metal wall and a resistance coil wound inside of the wall, electrically insulated therefrom and supported thereby, the coil being hollow so as to form an air core, three terminals carried by the frame and three connecting wires connecting said three terminals to the leads of said coil, the three connecting wires being of substantially equal resistance.

In testimony whereof, we have signed our names to this specification, in the presence of two subscribing witnesses.

CHARLES H. WILSON.
CUTHBERT J. BROWN.

Witnesses:
EDWARD WILLIAMS,
ETHEL HAMILTON.